US012773584B2

(12) United States Patent
Hamburg et al.

(10) Patent No.: US 12,773,584 B2
(45) Date of Patent: Oct. 27, 2026

(54) APPARATUS AND METHOD FOR PASSIVATING A FLAMMABLE POWDER

(71) Applicant: The Boeing Company, Arlington, VA (US)

(72) Inventors: Dalton W. Hamburg, Bothell, WA (US); Eric M. Chapman, Bonney Lake, WA (US)

(73) Assignee: The Boeing Company, Arlington, VA (US)

( * ) Notice: Subject to any disclaimer, the term of this patent is extended or adjusted under 35 U.S.C. 154(b) by 364 days.

(21) Appl. No.: 18/170,712

(22) Filed: Feb. 17, 2023

(65) Prior Publication Data

US 2024/0278051 A1 Aug. 22, 2024

(51) Int. Cl.

| | |
|---|---|
| ***A62C 3/06*** | (2006.01) |
| ***A62C 35/68*** | (2006.01) |
| ***B09B 3/00*** | (2022.01) |
| ***B29C 64/30*** | (2017.01) |
| ***B33Y 40/00*** | (2020.01) |

(52) U.S. Cl.

CPC ................ *A62C 3/06* (2013.01); *A62C 35/68* (2013.01); *B09B 3/00* (2013.01); *B29C 64/30* (2017.08); *B33Y 40/00* (2014.12)

(58) Field of Classification Search

CPC ........... A62C 3/06; A62C 35/68; B33Y 40/00; B29C 64/30; B09B 3/00

USPC .......................................... 169/66, 68, 70, 16

See application file for complete search history.

(56) References Cited

U.S. PATENT DOCUMENTS

| | | | | |
|---|---|---|---|---|
| 4,637,473 A * | 1/1987 | Gillis | A62C 37/00 55/432 |
| 5,092,407 A * | 3/1992 | Laurenson, Jr. | C05F 17/95 169/68 |
| 7,753,989 B2 | 7/2010 | Ernst et al. | |
| 2013/0333780 A1 | 12/2013 | Chan | |
| 2020/0061922 A1 | 2/2020 | Meiners et al. | |
| 2022/0266519 A1 | 8/2022 | Morganson et al. | |

FOREIGN PATENT DOCUMENTS

| | | |
|---|---|---|
| CN | 109570489 A | 4/2019 |
| DE | 10 2020 000501 A1 | 7/2021 |
| DE | 102020134299 | 6/2022 |
| WO | 2021/043801 A1 | 3/2021 |

OTHER PUBLICATIONS

"Overview of Disposal Procedures for Powder Concentrate Within Metal Powder Bed Fusion," Sintavia, LLC (2021).

European Patent Office, Extended European Search Report, App. No. 24155048.2 (Jul. 10, 2024).

* cited by examiner

*Primary Examiner* — Christopher S Kim

(74) *Attorney, Agent, or Firm* — Walters & Wasylyna LLC

(57) ABSTRACT

A flammable passivation apparatus includes a powder waste collection bin having a chamber in which a flammable powder can be filled. The apparatus also includes a fluid dispersion structure located in the chamber of the powder waste collection bin. The fluid dispersion structure is provided for enabling a passivation fluid to be dispersed throughout the chamber to passivate flammable powder contained in the chamber.

20 Claims, 5 Drawing Sheets

APPARATUS AND METHOD FOR PASSIVATING A FLAMMABLE POWDER

FIELD

The present disclosure generally relates to flammable powders and, more particularly, to an apparatus and method for passivating a flammable powder, such as flammable powder that is a by-product of an additive-manufacturing process.

BACKGROUND

Some additive-manufacturing processes produce as a by-product a flammable powder that needs to be properly disposed of.

A known way to dispose of the flammable powder is to passivate the powder by placing the powder in a disposal bin, layering the powder with sand, and then covering the sand with oil. The oil penetrates the sand to passivate the flammable powder that lies beneath the sand.

A drawback of the known way to dispose of the flammable powder is the time required for the oil to penetrate the sand and fully-passivate the powder. Another drawback is the requirement to move the disposal bin in a semi-passivated state from one location where the sand is layered to another location where the oil is added to cover the sand.

Despite advances already made, those skilled in the art continue with research and development efforts in the field of passivating flammable powders including flammable powders that are by-products of additive-manufacturing processes.

SUMMARY

Disclosed are flammable passivation apparatuses.

In one example, the disclosed flammable passivation apparatus includes a powder waste collection bin having a chamber in which a flammable powder can be filled. The apparatus also includes a fluid dispersion structure located in the chamber of the powder waste collection bin. The fluid dispersion structure is provided for enabling a passivation fluid to be dispersed throughout the chamber to passivate flammable powder contained in the chamber.

In another example, the disclosed flammable passivation apparatus includes a particle collection bin arranged to be filled with a flammable powder. The apparatus also includes a passivation structure arranged to transport a passivation fluid from outside of the particle collection bin to inside of the particle collection bin to allow passivation fluid to passivate flammable powder in the particle collection bin without exposing the flammable powder to air from outside of the particle collection bin.

Also disclosed are flammable powder passivation methods.

In one example, the disclosed flammable powder passivation method includes pre-inserting a fluid dispersion structure into a chamber of a powder waste collection bin. The method also includes filling the chamber of the powder waste collection bin with a flammable powder to be disposed of. The method further includes presenting a non-volatile fluid into the fluid dispersion structure to disperse throughout the chamber of the powder waste collection bin to coat the flammable powder with the non-volatile fluid to passivate the flammable powder.

Also disclosed are powder waste collection bins comprising a flammable, titanium-based powder that is passivated according to the flammable powder passivation method.

Other examples of the disclosed flammable powder passivation apparatuses and methods will become apparent from the following detailed description, the accompanying drawings and the appended claims.

DETAILED DESCRIPTION

The present application is directed to a flammable powder passivation apparatus and method in an additive-manufacturing environment, such as a laser powder bed fusion additive-manufacturing environment. The specific construction of the apparatus and method therefor and the industry in which the apparatus and method are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes a flammable powder passivation apparatus and method for additive-manufacturing of aerospace parts. The apparatus and method may be implemented by an original equipment manufacturer (OEM) in compliance with military and space regulations. It is conceivable that the disclosed apparatus and method may be implemented in many other industries.

Figure 1:
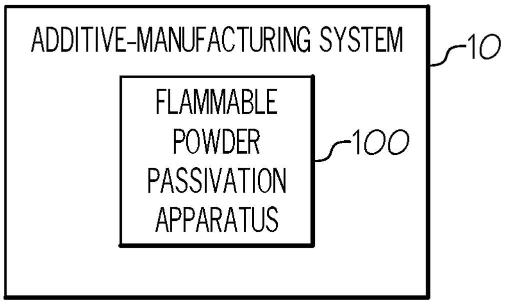
FIG. 1 is a schematic block diagram of an additive-manufacturing system embodying a flammable powder passivation apparatus constructed in accordance with an example implementation.

Referring to FIG. 1, a schematic block diagram of an additive-manufacturing system 10 is illustrated. The additive-manufacturing system 10 embodies a flammable powder passivation apparatus 100 constructed in accordance with an example implementation.

Figure 2:
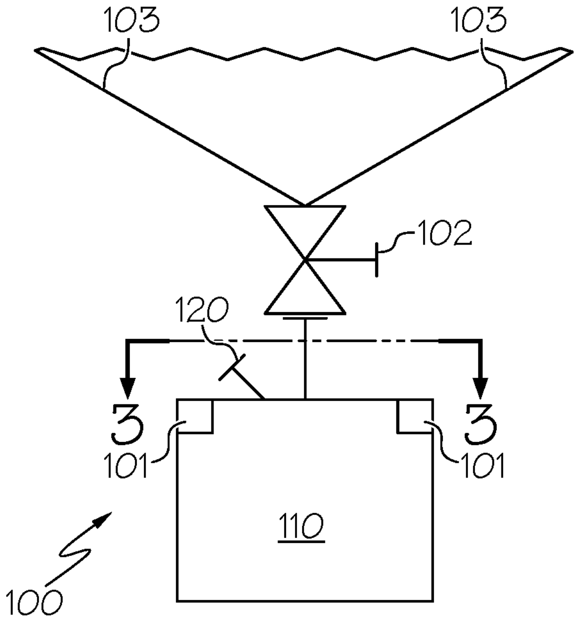
FIG. 2 is a schematic view of the flammable powder passivation apparatus of FIG. 1.

Referring to FIG. 2, a schematic view of the flammable powder passivation apparatus 100 is illustrated. The flammable powder passivation apparatus 100 includes a powder waste collection bin 110. A pair of locking levers 101 with safety interlocks prevent access to interior of the powder waste collection bin 110. Another locking lever 102 controls flow of flammable powder (not shown in FIG. 2) from interior of a funnel bin 103 to interior of the powder waste collection bin 110. When the locking lever 102 is open, flammable powder can flow from interior of the funnel bin 103 to interior of the powder waste collection bin 110. When the locking lever 102 is closed, flammable powder is blocked and unable to flow from interior of the funnel bin 103 to interior of the powder waste collection bin 110.

Figure 3:
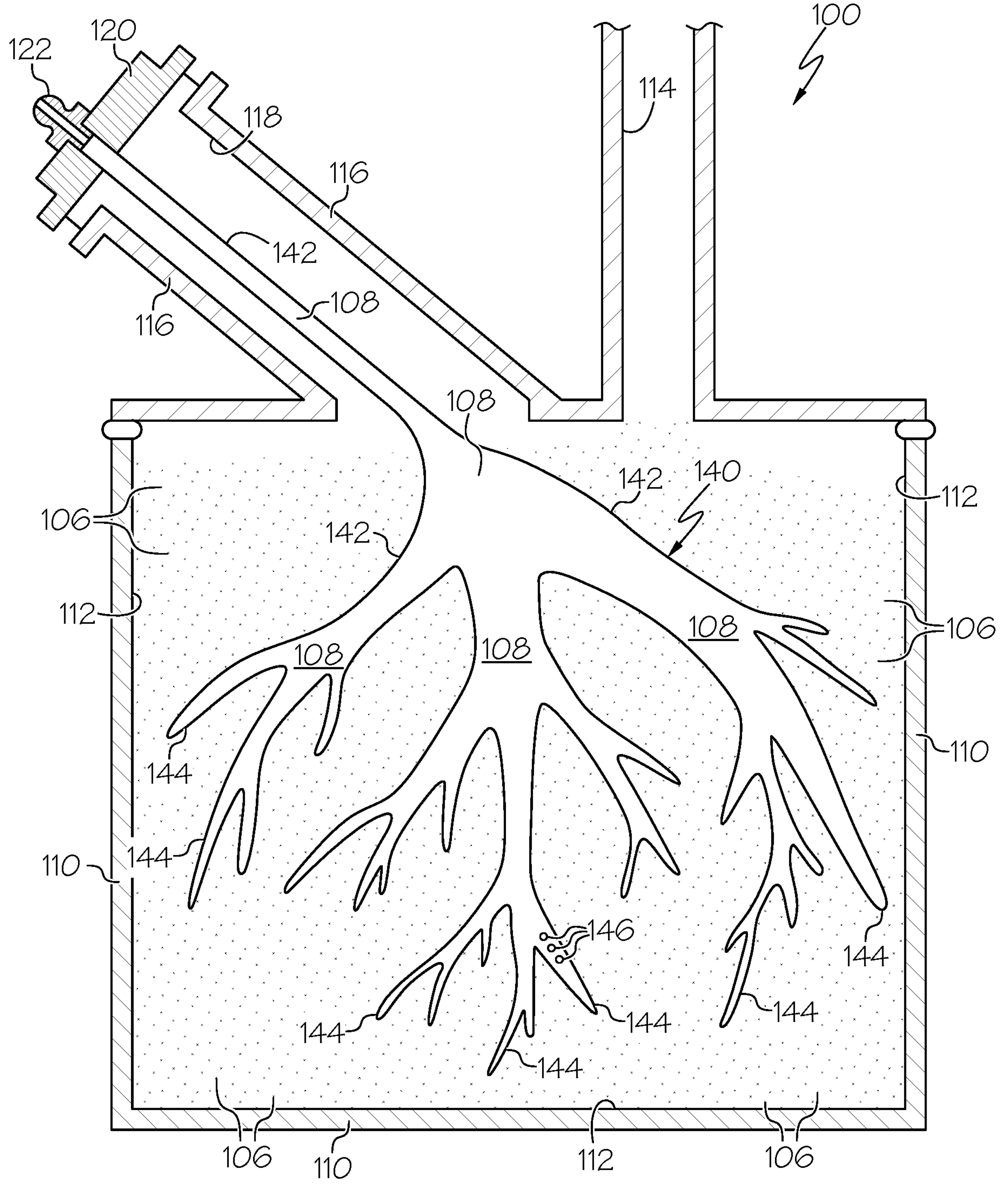
FIG. 3 is a sectional view, taken into the page approximately along line 3-3 in FIG. 2, showing certain components of the flammable powder passivation apparatus.

Referring to FIG. 3, a sectional view, taken into the page approximately along line 3-3 in FIG. 2, is illustrated. FIG. 3 shows certain components of the flammable powder passivation apparatus 100. In FIG. 3, the apparatus 100 includes the powder waste collection bin 110 that has a chamber 112 in which a flammable powder 106 (represented by dots in the chamber 112) can be filled. The powder waste collection bin 110 has a first opening 114 through which the flammable powder 106 can flow to fill the chamber 112 with the flammable powder 106.

The flammable powder 106 may comprise any type of powder. As an example, the flammable powder 106 may comprise a flammable titanium-based powder. The flammable powder 106 may comprise a flammable powder condensate (e.g., a mixture of a flammable powder with a carrier gas). The carrier gas may comprise an inert gas, such as argon, for example.

The powder waste collection bin 110 includes a funnel portion 116 that has a second opening 118 through which a passivation fluid 108 can flow to fill the chamber 112 with the passivation fluid 108, as will be described herein. The passivation fluid 108 may comprise any type of non-volatile fluid. As an example, the passivation fluid 108 may comprise oil, such as a flame-retarding oil.

The powder waste collection bin 110 further includes a passivation connection cap 120 (also shown in FIG. 2) that covers the second opening 118. The powder waste collection bin 110 also includes a fluid fitting 122 that is located in the passivation connection cap 120. It is conceivable that a spring-loaded fitting be used in place of the fluid fitting 122. Other types of fittings are possible.

The fluid fitting 122 is operative to allow passivation fluid 108 to flow one-way from outside of the powder waste collection bin 110 to inside of the powder waste collection bin 110 to fill the chamber 112 with the passivation fluid 108. The passivation connection cap 120 and the fluid-fitting 122 cooperate together to isolate the chamber 112 from outside air.

In accordance with an aspect of the present disclosure, the powder waste collection bin 110 includes a fluid dispersion structure 140 located in the chamber 112 of the powder waste collection bin 110. The fluid dispersion structure 140 is pre-inserted in the chamber 112. The fluid dispersion structure 140 enables the passivation fluid 108 to be dispersed throughout the chamber 112 to passivate flammable powder 106 contained in the chamber 112. The fluid dispersion structure 140 may comprise a bound aggregate material.

In an example implementation, the fluid dispersion structure 140 comprises a porous conduit 142 having low resistance to flow of the passivation fluid 108 from inside of the porous conduit 142 to outside of the porous conduit 142. The fluid dispersion structure 140 further comprises a number of self-supporting tubes 144, which may be rigid, and which may have a series of weeping holes 146 through which the passivation fluid 108 can flow from inside of the tubes 144 to outside of the tubes 144. For simplicity and purpose of explanation, only three weeping holes 146 are shown in FIG. 3. However, in practice, those skilled in the art will appreciate that the fluid dispersion structure 140 may have many more weeping holes 146.

Each of the tubes 144 has a diameter sufficient to support capillary action of the passivation fluid 108. The passivation fluid 108 outside of the tubes 144 then disperses and covers the flammable powder 106 (and sand which covers the flammable powder 106 and is not shown in FIG. 3) in the chamber 112 to passivate the flammable powder 106.

It should be apparent that a particle collection bin (i.e., the powder waste collection bin 110) is arranged to be filled with the flammable powder 106, and that a passivation structure (i.e., the fluid dispersion structure 140) having a large surface area is arranged to transport the passivation fluid 108 from outside to inside of the powder waste collection bin 110. The large surface area provided by the structure 140 allows the passivation fluid 108 to disperse throughout the chamber 112 to coat all regions of the flammable powder 106 to passivate the flammable powder 106, without exposing the flammable powder 106 to air from outside of the powder waste collection bin 110.

Figure 4:
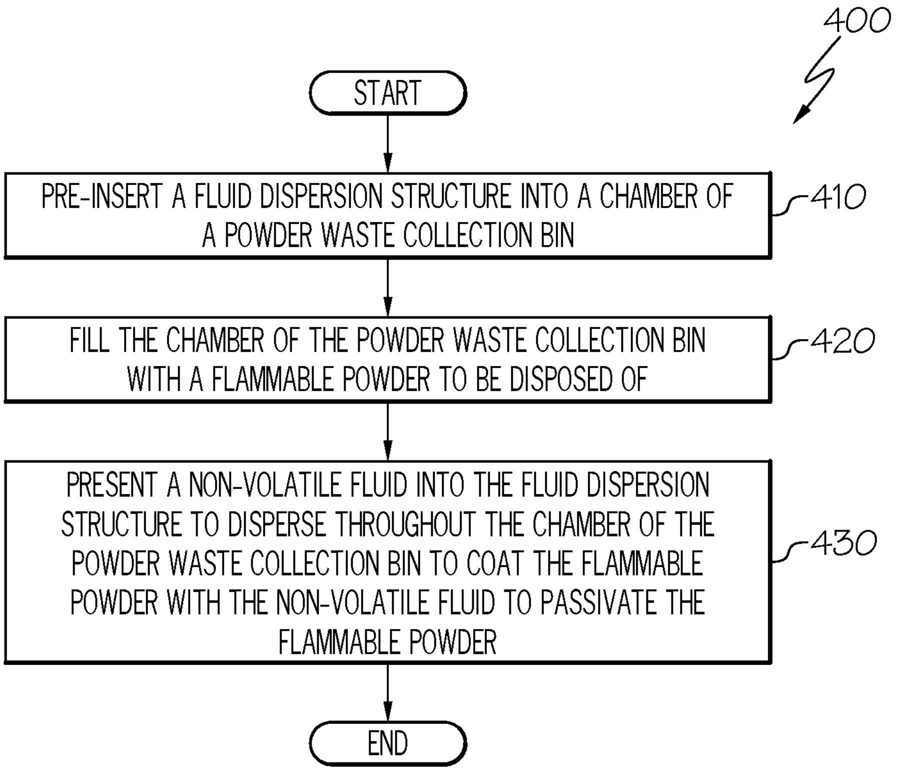
FIG. 4 is a flow diagram depicting a flammable powder passivation method in accordance with an example implementation.

Referring to FIG. 4, a flow diagram 400 of a flammable powder passivation method in accordance with an example implementation is illustrated. In block 410, a fluid dispersion structure is pre-inserted into a chamber of a powder waste collection bin. The process proceeds to block 420 in which the chamber of the powder waste collection bin is filled with a flammable powder to be disposed of. Then in block 430, a non-volatile fluid is presented into the fluid dispersion structure to disperse throughout the chamber of the powder waste collection bin to coat the flammable powder with the non-volatile fluid to passivate the flammable powder. The process then ends.

In some embodiments, the non-volatile fluid is presented into the fluid dispersion structure without exposing the flammable powder to air.

In some embodiments, oil is presented into the fluid dispersion structure to disperse throughout the chamber of the powder waste collection bin to coat the flammable powder with the oil to passivate the flammable powder. The oil may be a natural oil or a synthetic oil.

In some embodiments, a flame-retarding oil is presented into the fluid dispersion structure to disperse throughout the chamber of the powder waste collection bin to coat the flammable powder with the flame-retarding oil to passivate the flammable powder.

In some embodiments, the chamber of the powder waste collection bin is filled with a flammable powder condensate that comprises a carrier gas that is mixed with the flammable powder to be disposed of.

In some embodiments, the chamber of the powder waste collection bin is filled with a flammable powder condensate that comprises an inert gas that is mixed with the flammable powder to be disposed of.

In some embodiments, a bound aggregate structure is pre-inserted into the chamber of the powder waste collection bin.

In some embodiments, a powder waste collection bin comprising a flammable, titanium-based powder is passivated according to the disclosed flammable powder passivation method.

A number of advantages are provided by the apparatus and method disclosed herein. One advantage is that the passivation fluid 108 can be presented into the chamber 112 of the powder waste collection bin 110 without exposing the flammable powder 106 to air from outside of the chamber 112.

Another advantage is that the passivation fluid 108 is dispersed into all regions of the flammable powder 106 by the fluid dispersing structure 140. As a result, the passivation fluid 108 is carried into regions of the flammable powder 106 that would have otherwise not been passivated.

Yet another advantage is that the time needed for the passivation fluid 108 to penetrate into the flammable powder

106 is greatly reduced. The result is not only time savings, but also labor-cost savings in managing disposal of the flammable powder 106.

Figure 5:
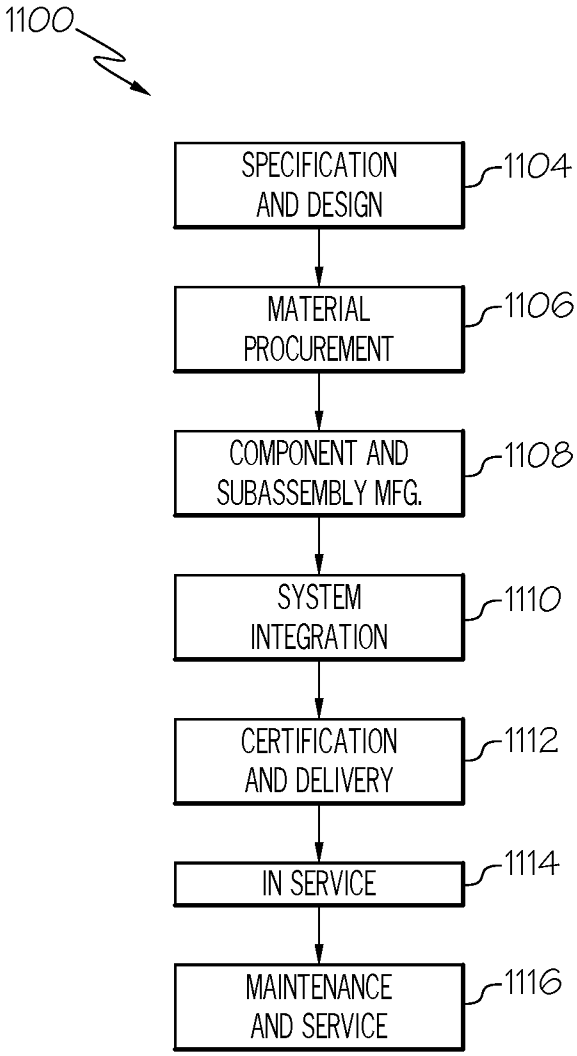
FIG. 5 is a block diagram of aircraft production and service methodology.
Figure 6:
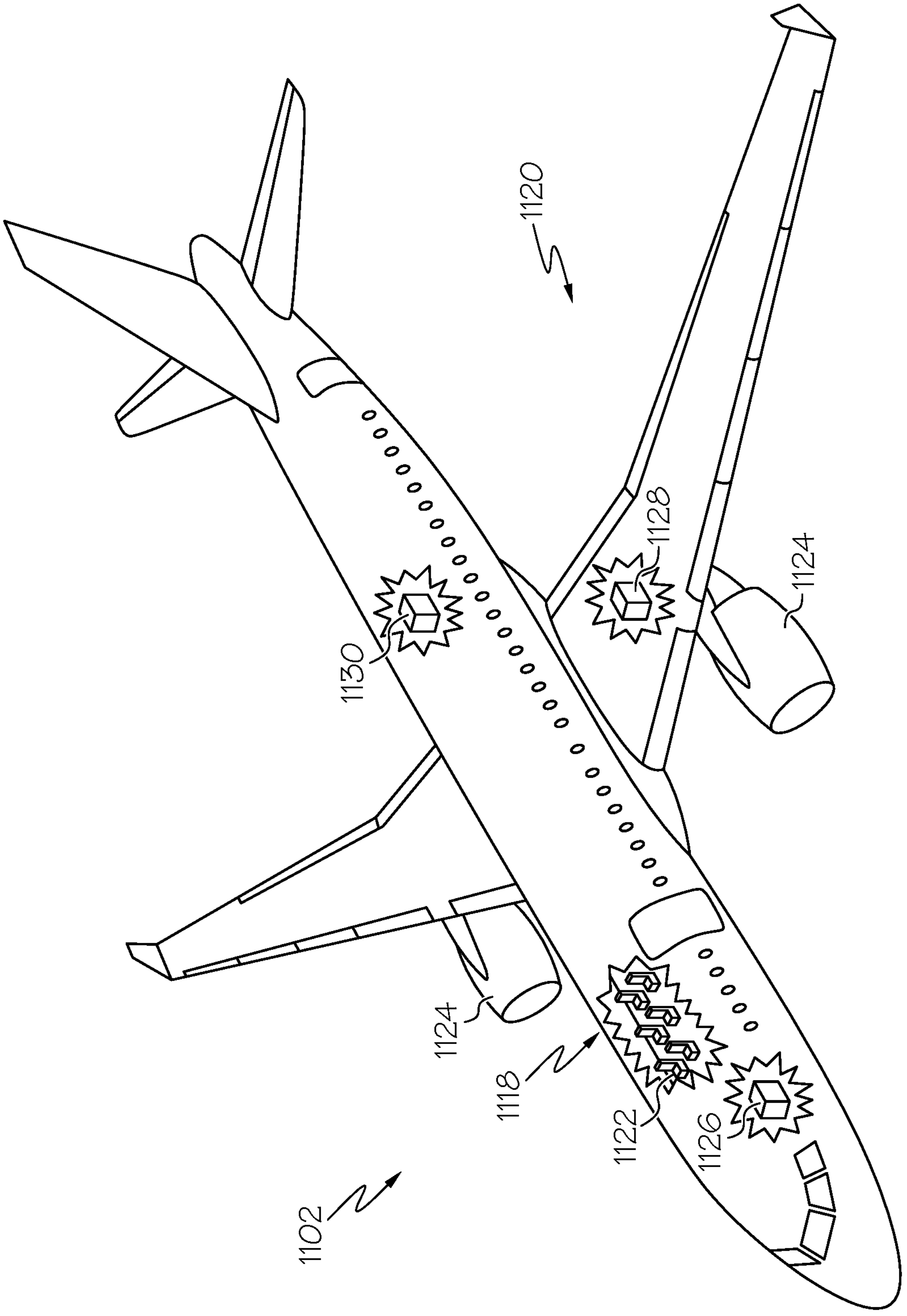
FIG. 6 is a schematic illustration of an aircraft.

Examples of the disclosure may be described in the context of an aircraft manufacturing and service method 1100, as shown in FIG. 5, and an aircraft 1102, as shown in FIG. 6. During pre-production, the aircraft manufacturing and service method 1100 may include specification and design 1104 of the aircraft 1102 and material procurement 1106. During production, component/subassembly manufacturing 1108 and system integration 1110 of the aircraft 1102 takes place. Thereafter, the aircraft 1102 may go through certification and delivery 1112 in order to be placed in service 1114. While in service by a customer, the aircraft 1102 is scheduled for routine maintenance and service 1116, which may also include modification, reconfiguration, refurbishment and the like.

Each of the processes of method 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 6, the aircraft 1102 produced by example method 1100 may include an airframe 1118 with a plurality of systems 1120 and an interior 1122. Examples of the plurality of systems 1120 may include one or more of a propulsion system 1124, an electrical system 1126, a hydraulic system 1128, and an environmental system 1130. Any number of other systems may be included.

The disclosed apparatus and method may be employed during any one or more of the stages of the aircraft manufacturing and service method 1100. As one example, components or subassemblies corresponding to component/subassembly manufacturing 1108, system integration 1110, and/or maintenance and service 1116 may be assembled using the disclosed apparatus and method. As another example, the airframe 1118 may be constructed using the disclosed apparatus and method. Also, one or more apparatus examples, method examples, or a combination thereof may be utilized during component/subassembly manufacturing 1108 and/or system integration 1110, for example, by substantially expediting assembly of or reducing the cost of an aircraft 1102, such as the airframe 1118 and/or the interior 1122. Similarly, one or more apparatus examples, method examples, or a combination thereof may be utilized while the aircraft 1102 is in service, for example and without limitation, to maintenance and service 1116.

Different examples of the apparatus and method disclosed herein include a variety of components, features, and functionalities. It should be understood that the various examples of the apparatus and method disclosed herein may include any of the components, features, and functionalities of any of the other examples of the apparatus and method disclosed herein in any combination, and all of such possibilities are intended to be within the scope of the present disclosure.

The above-described apparatus and method are described in the context of an aircraft. However, one of ordinary skill in the art will readily recognize that the disclosed apparatus and method are suitable for a variety of applications, and the present disclosure is not limited to aircraft manufacturing applications. For example, the disclosed apparatus and method may be implemented in various types of vehicles including, for example, helicopters, passenger ships, automobiles, marine products (boat, motors, etc.) and the like. Non-vehicle applications are also contemplated.

Although the above-description describes an apparatus and method for disposing of a flammable powder in the aviation industry in accordance with military and space regulations, it is contemplated that the apparatus and method may be implemented to facilitate for disposing a flammable powder in any industry in accordance with the applicable industry standards. The specific apparatus and method can be selected and tailored depending upon the particular application.

Further, although various examples of disclosed embodiments have been shown and described, modifications may occur to those skilled in the art upon reading the specification. The present application includes such modifications and is limited only by the scope of the claims.

What is claimed is:

1. A flammable powder passivation apparatus comprising:

a powder waste collection bin having a chamber in which a flammable powder can be filled; and a fluid dispersion structure located in the chamber of the powder waste collection bin, wherein the fluid dispersion structure comprises a first porous conduit having a first end in fluid communication with an exterior of the chamber and a second end extending towards a central portion of the chamber, and wherein the second end branches into a plurality of sub-conduits that extend further towards the central portion of the chamber; and an oil disposed within the fluid dispersion structure for distribution through the first porous conduit and the plurality of sub-conduits to passivate the flammable powder contained in the chamber.

2. The flammable powder passivation apparatus of claim 1 wherein the powder waste collection bin has (i) a first opening through which the flammable powder can flow to fill the chamber with the flammable powder, and (ii) a second opening through which the oil can flow to fill the chamber with the oil.

3. The flammable powder passivation apparatus of claim 2 wherein the powder waste collection bin comprises a portion that has the second opening through which the oil can flow into the chamber.

4. The flammable powder passivation apparatus of claim 3 wherein the powder waste collection bin comprises a passivation connection cap that covers the second opening.

5. The flammable powder passivation apparatus of claim 4 wherein the powder waste collection bin comprises a fluid fitting that is located in the passivation connection cap and is operative to allow the oil to flow from the outside of the powder waste collection bin through the fluid dispersion structure to the inside of the powder waste collection bin to fill the chamber with the oil.

6. The flammable powder passivation apparatus of claim 1 wherein each of the plurality of sub-conduits branches in a plurality of additional sub-conduits.

7. The flammable powder passivation apparatus of claim 1, wherein each of the plurality of sub-conduits comprise self-supporting tubes having a series of weeping holes through which the oil can flow from an inside to an outside of the tubes.

8. The flammable powder passivation apparatus of claim 7, wherein each of the self-supporting tubes have a diameter sufficient to support capillary action of the oil.

9. The flammable powder passivation apparatus of claim 1, wherein the fluid dispersion structure comprises a bound aggregate material.

10. The flammable powder passivation apparatus of claim 1, wherein the fluid dispersion structure has a surface area sufficient to allow the oil to disperse into all regions of the flammable powder in the chamber.

11. The flammable powder passivation apparatus of claim 1, wherein the fluid dispersion structure is positioned to direct the oil toward a lower region of the chamber.

12. The flammable powder passivation apparatus of claim 1, wherein the powder waste collection bin comprises at least one safety interlock configured to prevent access to the chamber during passivation.

13. The flammable powder passivation apparatus of claim 1, wherein the oil comprises a flame-retardant oil.

14. A flammable powder passivation apparatus comprising:

a sealed powder waste collection bin defining a chamber;

a closure coupled to the powder waste collection bin and covering an opening into the chamber, the closure comprising a port operative to provide fluid communication with the chamber while maintaining the chamber isolated from outside air;

a fluid dispersion structure disposed within the chamber and comprising a first porous conduit extending into the chamber and branching into a plurality of sub-conduits that extend toward a central portion of the chamber; and an oil disposed within the fluid dispersion structure for distribution through the first porous conduit and the plurality of sub-conduits to passivate a flammable powder contained in the chamber.

15. The flammable powder passivation apparatus of claim 14, wherein the oil comprises a flame-retardant oil.

16. The flammable powder passivation apparatus of claim 14, wherein the fluid dispersion structure comprises a bound aggregate material.

17. The flammable powder passivation apparatus of claim 14, wherein the sub-conduits comprise a plurality of weeping holes dimensioned to promote capillary movement of the oil.

18. A flammable powder passivation apparatus comprising:

a sealed powder waste collection bin having a chamber, the sealed powder waste collection bin having a first opening through which a flammable powder can flow to fill the chamber and a second opening;

a passivation connection cap covering the second opening;

a fluid fitting located in the passivation connection cap;

a fluid dispersion structure pre-inserted in the chamber and fluidly coupled to the fluid fitting, the fluid dispersion structure comprising a porous conduit extending into the chamber and a plurality of self-supporting tubes branching from the porous conduit toward a central portion of the chamber; and an oil disposed within the porous conduit and the plurality of self-supporting tubes, wherein the passivation connection cap and the fluid fitting cooperate to isolate the chamber from outside air, wherein each of the self-supporting tubes has a series of weeping holes and a diameter sufficient to support capillary movement of the oil from inside the tube to outside the tube.

19. The flammable powder passivation apparatus of claim 18, further comprising a locking lever arranged to control the flow of the flammable powder through the first opening of the sealed powder waste collection bin.

20. The flammable powder passivation apparatus of claim 18, wherein the oil comprises a flame-retardant oil.

* * * * *